(12) United States Patent
Miura et al.

(10) Patent No.: US 6,395,072 B2
(45) Date of Patent: May 28, 2002

(54) CANISTER MOUNTING STRUCTURE

(75) Inventors: Kentaro Miura; Kiyohumi Shida; Takeaki Nakajima, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/849,990

(22) Filed: May 8, 2001

(30) Foreign Application Priority Data

Jun. 6, 2000 (JP) .......................................... 2000-168774

(51) Int. Cl.[7] .......................... F02M 25/08; B01D 53/04
(52) U.S. Cl. .......................... 96/133; 96/147; 55/385.3; 123/519; 248/311.2
(58) Field of Search .......................... 96/121, 131, 133, 96/147; 55/385.3, 513; 123/518–521; 248/311.2, 674

(56) References Cited

U.S. PATENT DOCUMENTS 5,071,100 A * 12/1991 Sweeny ...................... 248/313
5,089,938 A * 2/1992 White et al. ................ 55/385.3
5,632,808 A * 5/1997 Hara et al. ...................... 96/137
5,851,268 A * 12/1998 Hyodo et al. .................. 96/131
6,234,445 B1 * 5/2001 Yoon .......................... 248/638

FOREIGN PATENT DOCUMENTS

| JP | 5-187330 | 7/1993 |
|----|----------|--------|
| JP | 7-12012 | 1/1995 |
| JP | 9-21361 | 1/1997 |
| JP | 9-25855 | 1/1997 |
| JP | 09-296754 | 11/1997 |

* cited by examiner

Primary Examiner—David A. Simmons
Assistant Examiner—Frank M. Lawrence
(74) Attorney, Agent, or Firm—Armstrong, Westerman & Hattori, LLP

(57) ABSTRACT

A casing 13 of a canister C includes a main chamber 11 and a sub-chamber 12. Mounting portions 13a are formed between the main chamber 11 and the sub-chamber 12. The canister C is mounted on a mounting plate 35 with bolts 15 which pass through bolt holes 13b in the mounting portions 13a.

7 Claims, 6 Drawing Sheets

CANISTER MOUNTING STRUCTURE

BACKGROUND OF THE INVENTION

1. Field of the Invention

The present invention relates to a canister mounting structure which mounts a canister for adsorbing fuel vapor, on a vehicle body.

2. Description of the Related Art

A canister for adsorbing fuel vapor generated within an automotive fuel tank is known in JP-A-5-187330 and JP-A-9-21361 in which an interior of the canister is divided into a main chamber and a sub-chamber, so that the main chamber connects to the fuel tank and an intake passageway of an engine, while the sub-chamber communicates with the atmosphere, whereby fuel vapor is designed not to be blown out to the atmosphere.

Additionally, a canister for adsorbing fuel vapor generated within an automotive fuel tank is known in JP-A-7-12012 and JP-A-9-25855 in which, in order to mount the canister on a vehicle body, mounting brackets provided on the outer circumference of the canister are mounted on the vehicle body with bolts.

FIG. 7 shows one example of a conventional canister C mounting structure in which the canister is mounted on a vehicle body with bolts via mounting brackets provided on the outer circumference of a casing of the canister. That is, three mounting brackets 01a . . . are provided on the outer circumference of the casing 01 of the canister C in such a manner as to protrude outwardly. There are then provided three bolts 03 . . . which pass through the mounting brackets 01a . . . and a mounting plate 02 from the bottom to the top. Nuts 04 . . . are then fastened to the bolts 03 . . . so as to fix the casing 01 to the mounting plate 02. Thereafter, nuts 06 . . . are fastened to four bolts 05 . . . which pass through the mounting plate 02 and the vehicle body 07 from the bottom to the top, so as to fix the mounting plate 02 to the vehicle body 07.

With the canisters disclosed in JP-A-7-12012, JP-A-9-25855 and FIG. 7, since the mounting brackets of the canister are provided on the outer circumference of the casing thereof, there is caused a problem that the canisters are enlarged by such an extend that the mounting brackets protrude outwardly.

SUMMARY OF THE INVENTION

The invention was made in view of this situation, and an object thereof is to mount a canister comprising a main chamber and a sub-chamber on the vehicle body in a compact fashion.

With a view to attaining the object, according to a first aspect of the invention, there is provided a canister mounting structure for mounting a canister on a vehicle body with bolts, the canister comprising a casing having formed therein a main chamber and a sub-chamber each housing therein a fuel absorbent, a communicating path for providing a communication between the main chamber and the sub-chamber, a charge port for connecting the main chamber to a fuel tank, a purge port for connecting the main chamber to an intake passageway of an engine and an atmosphere communicating port for allowing the sub-chamber to communicate with the atmosphere, wherein the bolts are disposed in mounting portions formed between the main chamber and the sub-chamber of the casing.

According to the structure above, since the bolts for mounting the casing of the canister on the vehicle body are disposed at the mounting portions formed between the main chamber and the sub-chamber of the casing, it becomes possible to obviate a necessity of providing the mounting brackets on the outer circumference of the casing, whereby the casing can be miniaturized, thereby making it possible to mount the canister on the vehicle body in a compact fashion. Moreover, since the bolts do not have to be put through the main chamber and the sub-chamber, it becomes possible to obviate a necessity to seal bolt holes.

DETAILED DESCRIPTION OF THE PREFERRED EMBODIMENTS

A mode for carrying out the invention will be described below based on embodiments of the invention illustrated in the accompanying drawings.

Figure 1:
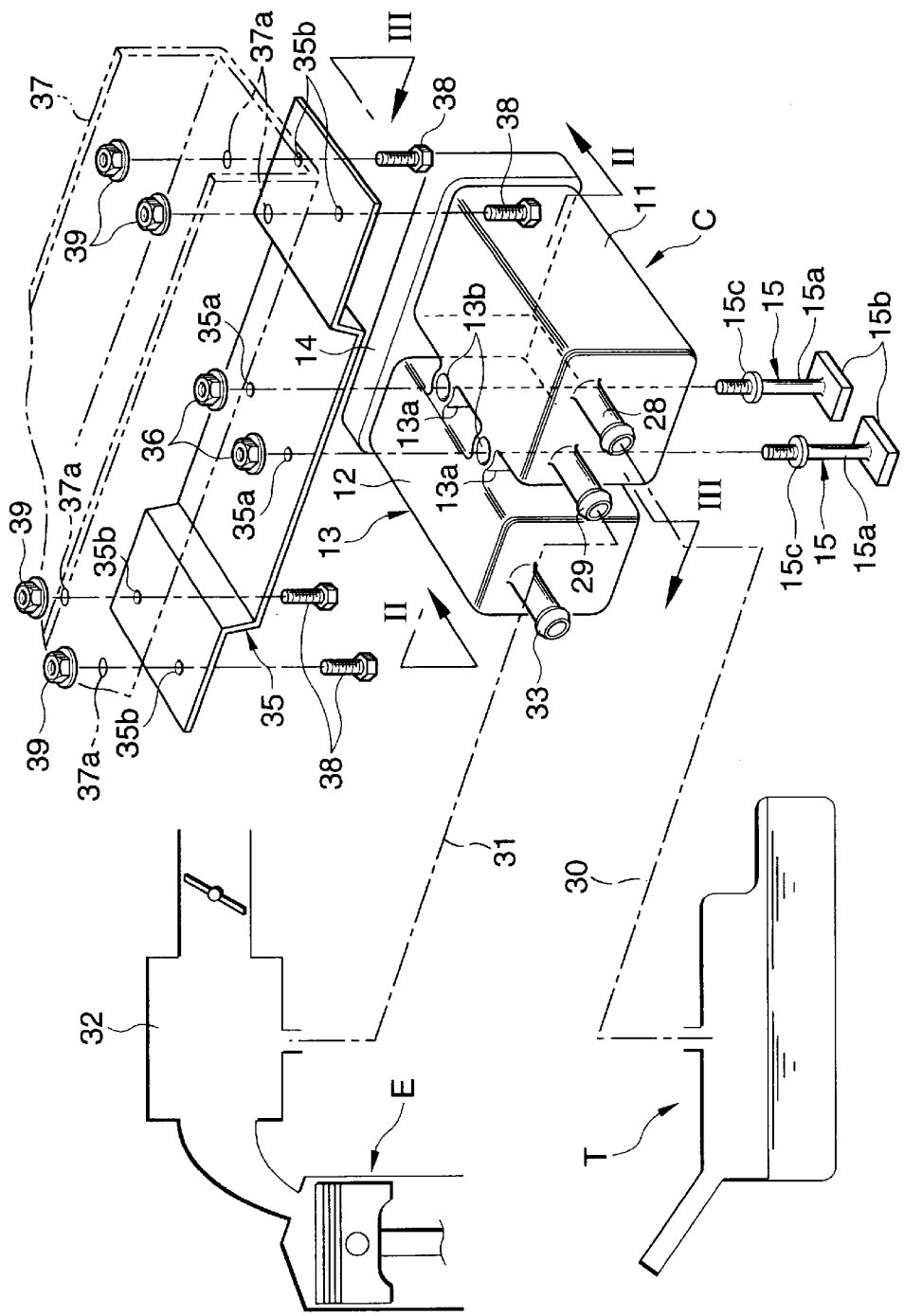
FIG. 1 is a perspective view showing a canister mounting structure.
Figure 2:
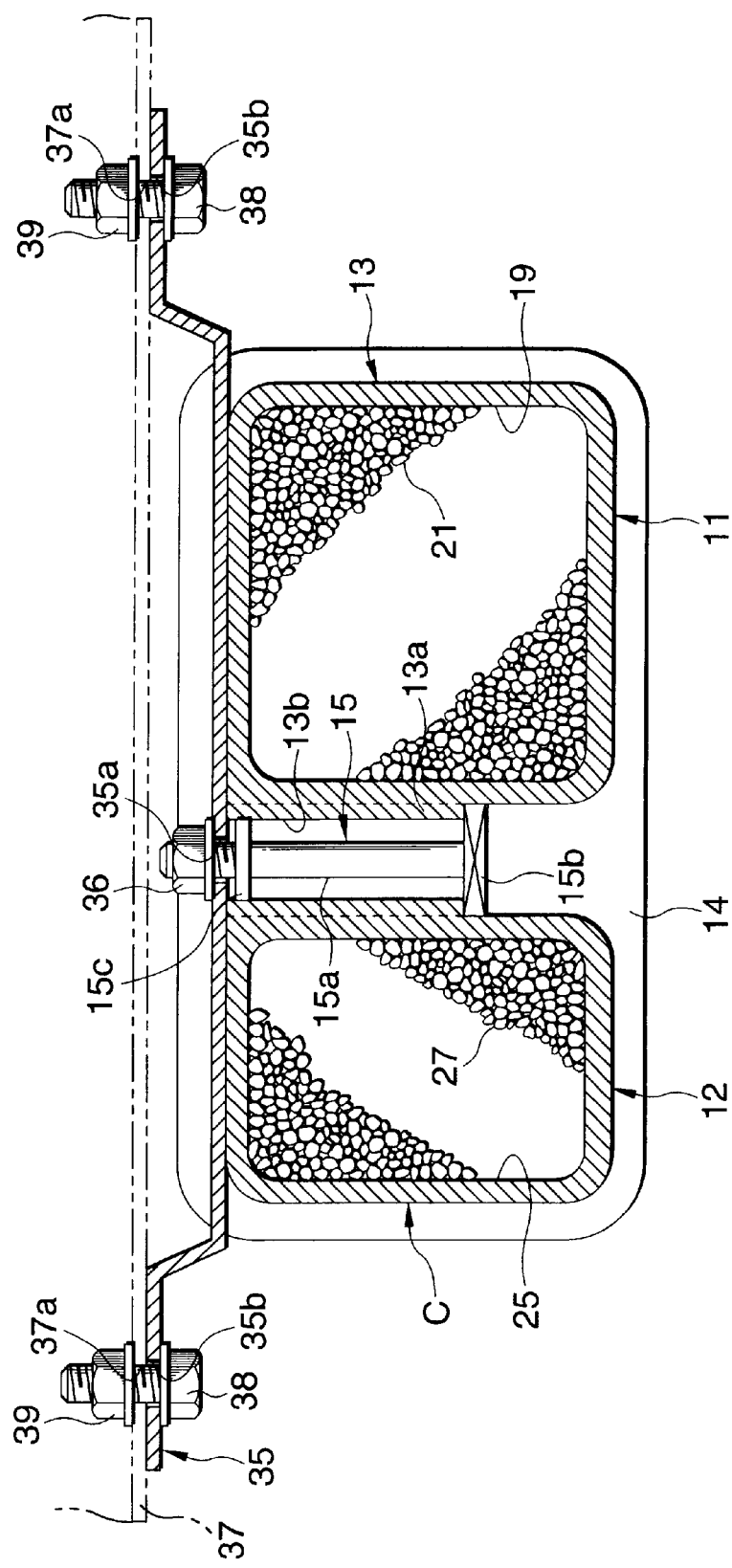
FIG. 2 is a cross-sectional view taken along the line II—II of FIG. 1.
Figure 3:
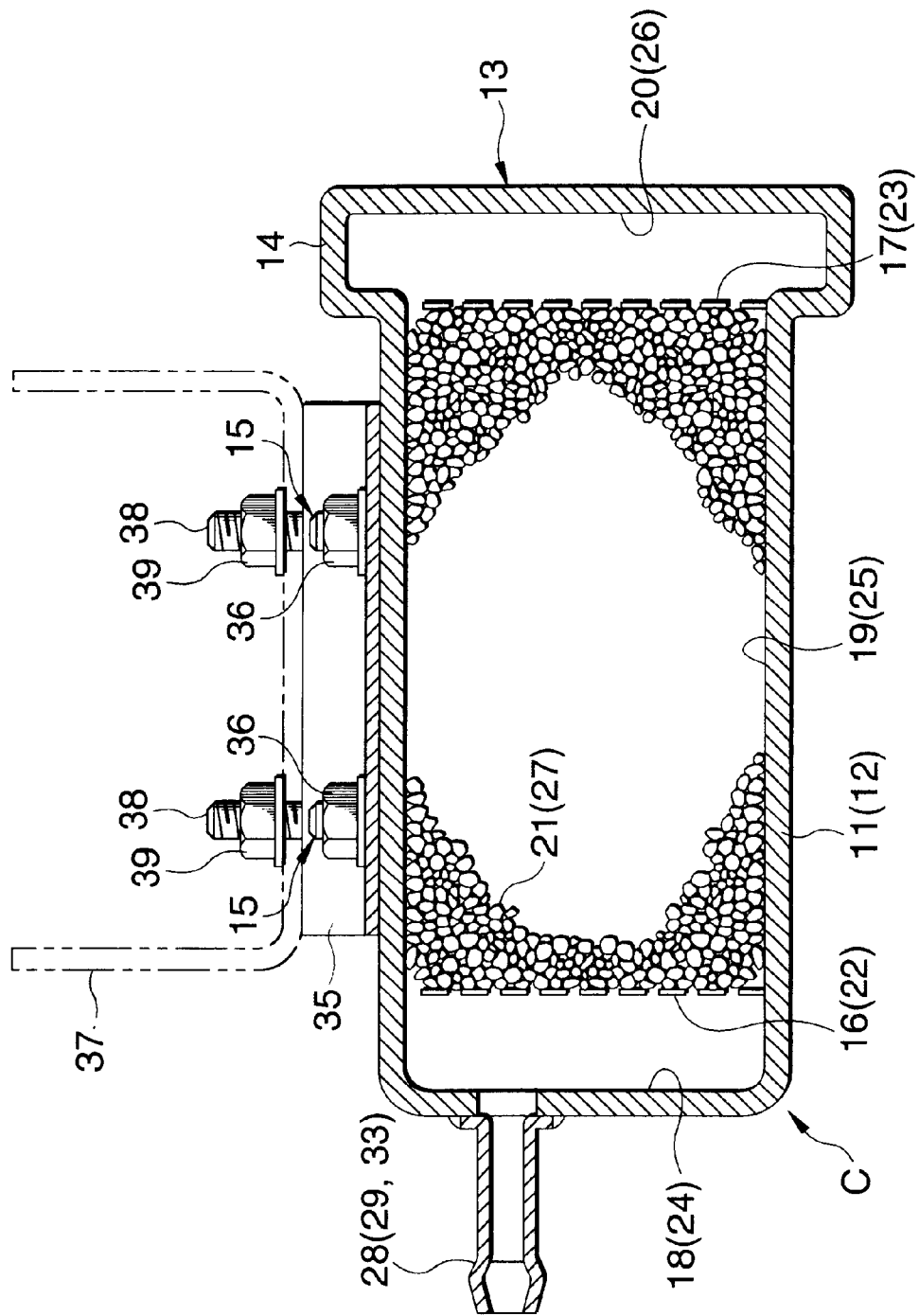
FIG. 3 is a longitudinal sectional view taken along the line III—III of FIG. 1.

As shown in FIGS. 1 to 3, an automotive canister C has a casing 13 in which a main chamber 11 having a larger capacity and a sub-chamber 12 having a smaller capacity are formed side by side, and the main chamber 11 and the sub-chamber 12 are connected to each other via two boss-like mounting portions 13a, 13a and a communicating end plate 14. Vertically formed in the mounting portions 13a, 13a are bolt holes 13b, 13b through which bolts 15, 15 are passed as will be described later. The main chamber 11 is partitioned with two porous plates 16, 17 into a first space 18, an adsorbent housing space 19 and a second space 20, and housed in the adsorbent housing space 19 is a fuel adsorbent 21 that can adsorb fuel vapor. The sub-chamber 12 is partitioned with two porous plates 22, 23 into a third space 24, an adsorbent housing space 25 and a fourth space 26, and housed in the adsorbent housing space 25 is a fuel adsorbent 27 that can adsorb fuel vapor. Both the second space 20 of the main chamber 11 and the fourth space 26 of the sub-chamber 12 are formed inwardly of the end plate 14 and are allowed to thereby communicate with each other.

Provided in the main chamber 11 are a charge port 28 and a purge port 29. The charge port 28 allows the first space 18 to communicate with an upper space in a fuel tank T via a charge path 30, and the purge port 29 allows the first space 18 to communicate with an intake passageway 32 of an engine E via a purge path 31. Provided in the sub-chamber 12 is an atmosphere communicating port 33, through which the third space 24 communicates with the atmosphere.

The bolts 15 for fixing the canister C each include a shank portion 15a which is externally threaded, a square plate-like head portion 15b and a disk-like spacer 15c fixed at an intermediate position of the shank portion 15a. When two bolts 15, 15 are inserted through the bolt holes 13b, 13b in the casing 13 from below, the head portions 15b, 15b are brought into abutment with external wall surfaces of the main chamber 11 and the sub-chamber 12, respectively, so as to prevent the rotation of the bolts, and the spacers 15c, 15c are fitted in inner surfaces of the bolt holes 13b, 13b, respectively to thereby be positioned radially. Then, nuts 36, 36 are fastened onto the shank portions 15a, 15a of the bolts 15, 15 which pass through two bolt holes 35a, 35a formed at central positions of a rectangular mounting plate 35 from below. Further, nuts 39 . . . are then fastened onto bolts 38 . . . which pass through four bolt holes 35b . . . formed in four corners of the mounting plate 35 and four bolt holes 37a . . . formed in the vehicle body 37 from below, whereby the canister C is mounted onto the vehicle body 37.

Next, a description will be given of the operation of the embodiment of the invention with the structure described above.

Fuel vapor generated within the fuel tank T when the engine E is stopped is supplied to the main chamber 11 of the canister C via the charge path 30 and the charge port 28, so that fuel vapor is absorbed by the fuel adsorbent 21 housed in the adsorbent housing space 19 to thereby prevent the diffusion of fuel vapor to the atmosphere. Fuel vapor supplied after the fuel adsorbent 21 of the main chamber 11 has been fully charged with fuel vapor is then supplied from the main chamber 11 into the sub-chamber 12 via the second space 20 and the fourth space 26 which are both inside the end plate 14, so that the fuel vapor is adsorbed by the fuel adsorbent 27 housed in the adsorbent housing space 25.

During the operation of the engine, when air is taken into from the atmosphere communicating port 33 of the canister C by virtue of a negative pressure generated in the intake passageway 32, fuel vapor purged from the fuel adsorbent 27 housed in the adsorbent housing space 25 of the sub-chamber 12 and fuel vapor purged from the fuel adsorbent 21 housed in the adsorbent housing space 19 of the main chamber 11 are drawn into the intake passageway 32 of the engine E via the purge port 29 and the purge passageway 31, whereby the fuel vapor is burned together with air-fuel mixtures.

When mounting the canister C to the vehicle body 37 with the bolts 15, 15, since the bolts 15, 15 are disposed in the mounting portions 13a, 13a interposed between the main chamber 11 and the sub-chamber 12 of the casing 13 for T, the canister C can be made smaller in comparison with the case where the canister C is mounted onto the vehicle body 37 by providing the mounting brackets on the outer circumference of the casing 13. Moreover, since the bolts 15, 15 do not pass through the main chamber 11 and the sub-chamber 12, the bolt holes 13b, 13b do not have to be sealed.

Figure 4:
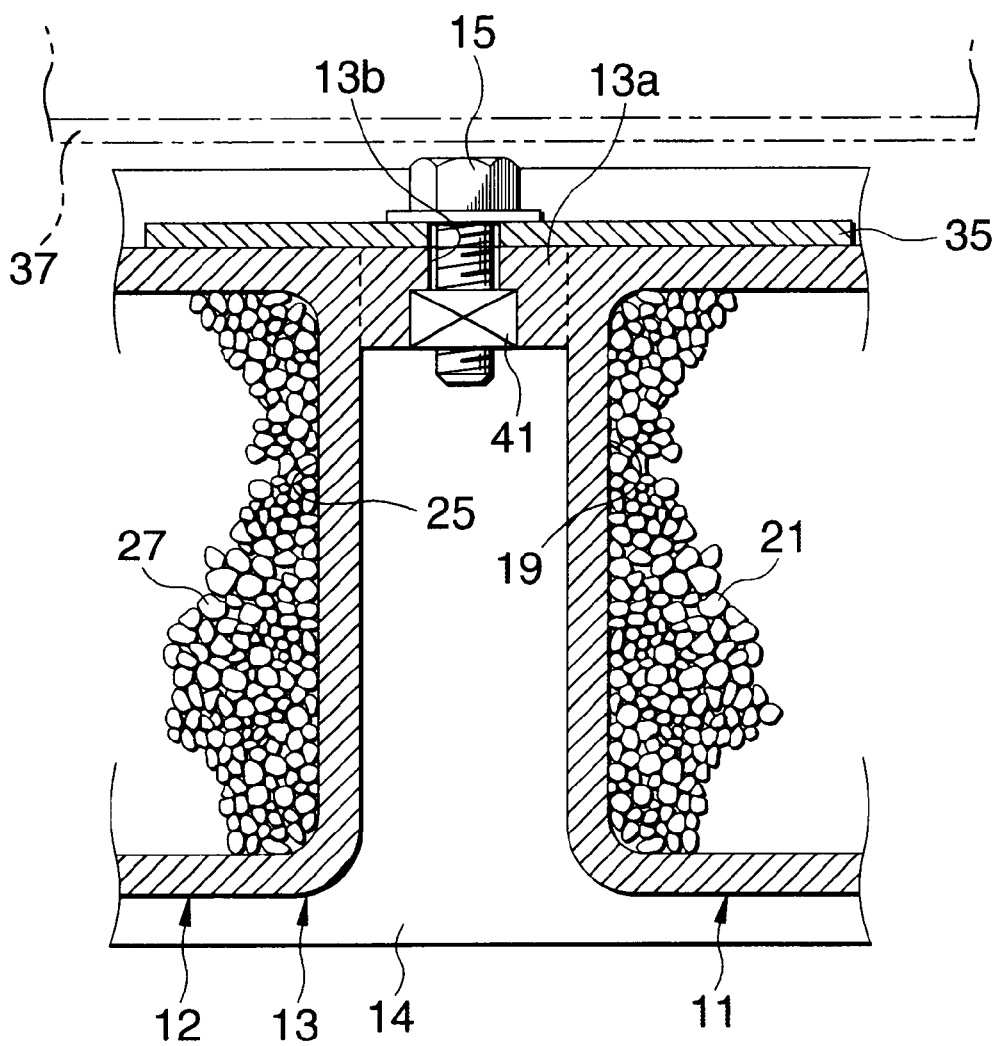
FIG. 4 is a diagram corresponding to FIG. 2, which shows a second embodiment of the invention.

Next, a second embodiment of the invention will be described with reference to FIG. 4.

While in the first embodiment, the canister C is mounted to the mounting plate 35 with the bolts 15, 15 which pass through the bolt holes 13b, 13b of the mounting portions 13a, 13a of the casing 13 from below to above, in the second embodiment, nuts 41, 41 are embedded in lower portions of bolt holes 13b, 13b of the mounting portions 13a, 13a of a casing 13. Then, the bolts 15, 15 inserted from the above of a mounting plate 35 fit in the mounting holes 13b, 13b, and are fastened to the nuts 41, 41, whereby the canister C is fixed to the mounting plate 35. Even with this second embodiment, similar operation and effectiveness to those of the first embodiment can be attained.

Figure 5:
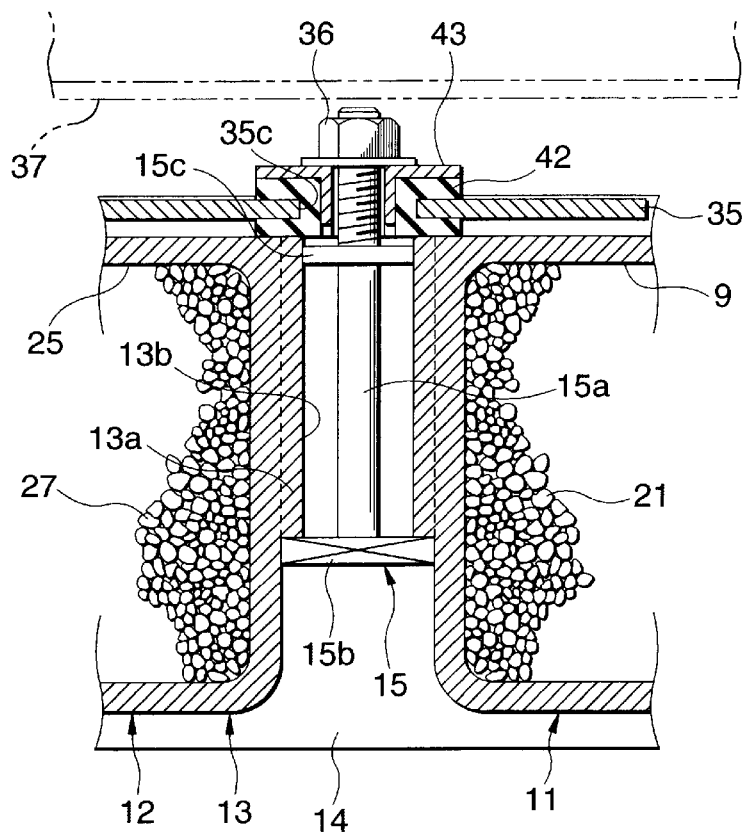
FIG. 5 is a diagram corresponding to FIG. 2, which shows a third embodiment of the invention.

Next, a third embodiment of the invention will be described below with reference to FIG. 5.

The third embodiment is an improvement to the first embodiment wherein the canister C is resiliently supported on the mounting plate 35. That is, rubber bushes 42, 42 and collars 43, 43 are mounted in rubber bush supporting holes 35c, 35c formed in the mounting plate 35 in advance, and the bolts 15, 15 pass through the bolt holes 13b, 13b in the mounting portions 13a, 13a of the casing 13 from below to above, and further pass through the rubber bushes 42, 42 and the collars 43, 43 to be thereby fastened to the mounting plate 35 with the nuts 36, 36. According to this embodiment, in addition to the operation and effectiveness provided by the first embodiment, it is possible to prevent the transmission of vibrations of the canister to the vehicle body 37.

Thus, while the embodiments of the invention have been described in detail as heretofore, the invention may be modified variously with respect to its design without departing from the scope and spirit thereof.

Figure 6:
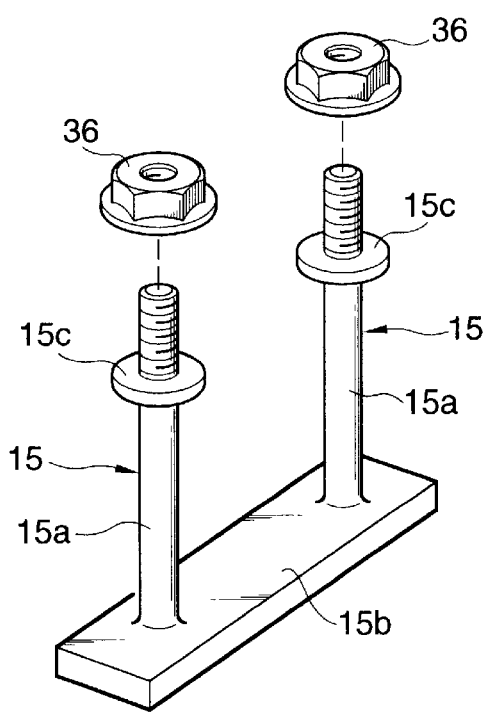
FIG. 6 is a diagram showing a structure of a bolt according to a fourth embodiment of the invention.
Figure 7:
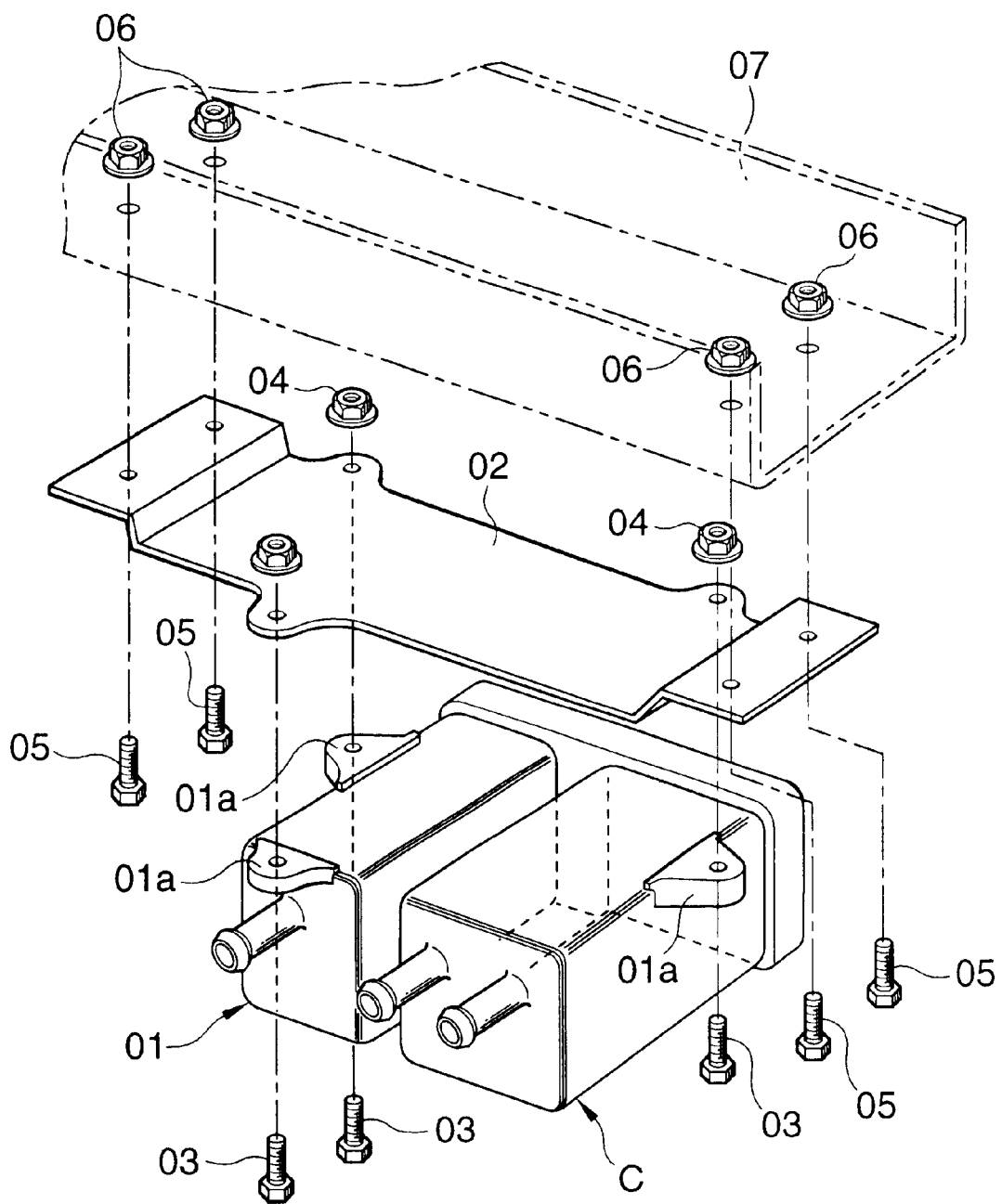
FIG. 7 is a perspective view showing a conventional canister mounting structure.

For example, as shown in a fourth embodiment illustrated in FIG. 6, the head portions 15b of the two bolts 15, 15 described in the first and third embodiments may be integrated into one head portion, whereby it is possible to reduce the number of components used and improve the assembling properties. In addition, while the canister C is mounted on the vehicle body 37 via the mounting plate 35, the canister C may be directly mounted on the vehicle body 37 without using the mounting plate 35.

Thus, according to the first aspect of the invention, since the bolts for mounting the casing of the canister on the vehicle body are disposed in the mounting portions formed between the main chamber and the sub-chamber of the casing, the necessity is obviated of providing the mounting brackets on the outer circumference of the casing, whereby the casing can be miniaturized, thereby making it possible to mount the canister on the vehicle body in a compact fashion. Moreover, since the bolts do not have to be put through the main chamber and the sub-chamber, the bolt holes do not have to be sealed.

What is claimed is:

1. A canister mounting structure for mounting a canister on a vehicle body with a mounting member, said canister comprising: a casing formed with a main chamber and a sub-chamber, each of which houses a fuel absorbent therein; a communicating path communicating between said main chamber and said sub-chamber; a charge port connecting said main chamber to a fuel tank; a purge port connecting said main chamber to an intake passageway of an engine; and an atmosphere communicating port allowing said sub-chamber to communicate with the atmosphere,
wherein said mounting member is disposed in a mounting portion formed between said main chamber and said sub-chamber of said casing.

2. The canister mounting structure according to claim 1, wherein said mounting member is constructed by a bolt and a nut.

3. The canister mounting structure according to claim 2, wherein said mounting portion is formed in a boss shape to define a bolt hole.

4. The canister mounting structure according to claim 2, wherein said bolt has a square-shaped head portion contactable with adjacent external wall surfaces of said main chamber and said sub-chamber.

5. The canister mounting structure according to claim 2, wherein said nut is embedded into said mounting portion of said canister.

6. The canister mounting structure according to claim 2, further comprising:
a resilient member provided around a bolt hole formed in a vehicle body side.

7. A canister adapted to be mounted on a vehicle body with a mounting member, comprising:
a casing formed with a main chamber and a sub-chamber, each of which houses a fuel absorbent therein;
a communicating path communicating between said main chamber and said sub-chamber;
a charge port connecting said main chamber to a fuel tank;
a purge port connecting said main chamber to an intake passageway of an engine;
an atmosphere communicating port allowing said sub-chamber to communicate with the atmosphere; and
a mounting portion formed between said main chamber and said sub-chamber of said casing, for disposing the mounting member therein.

* * * * *